(12) United States Patent
Csonka et al.

(10) Patent No.: US 12,034,478 B2
(45) Date of Patent: Jul. 9, 2024

(54) FEEDFORWARD MOTION COMPENSATION FOR FSOC TERMINALS

(71) Applicant: X Development LLC, Mountain View, CA (US)

(72) Inventors: Paul Csonka, Sunnyvale, CA (US); Baris Ibrahim Erkmen, Sunnyvale, CA (US); Devin Brinkley, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/709,544

(22) Filed: Mar. 31, 2022

(65) Prior Publication Data

US 2023/0318705 A1 Oct. 5, 2023

(51) Int. Cl.
*H04B 10/11* (2013.01)
(52) U.S. Cl.
CPC .................................... *H04B 10/11* (2013.01)
(58) Field of Classification Search
CPC ..................................................... H04B 10/11
USPC ............................................................ 398/131
See application file for complete search history.

(56) References Cited

U.S. PATENT DOCUMENTS

| | | | | |
|---|---|---|---|---|
| 7,343,099 B2* | 3/2008 | Wirth | ...................... | G02B 26/06 |
| | | | | 398/131 |
| 8,060,340 B2* | 11/2011 | Gao | ...................... | G05B 13/04 |
| | | | | 702/182 |
| 10,680,710 B1 | 6/2020 | Lantz et al. | | |
| 10,680,712 B2* | 6/2020 | Boroson | ................. | H04B 10/40 |
| 10,686,521 B1* | 6/2020 | Lantz | ................... | H04B 10/112 |
| 2005/0180753 A1* | 8/2005 | Wirth | .................... | G02B 26/06 |
| | | | | 398/118 |

(Continued)

FOREIGN PATENT DOCUMENTS

CA 2520710 C * 1/2012 ......... H04B 10/2543

(Continued)

OTHER PUBLICATIONS

International Search Report and Written Opinion for International Application No. PCT/US2022/052508 dated Apr. 14, 2023 (13 pages).

(Continued)

*Primary Examiner* — Abbas H Alagheband
(74) *Attorney, Agent, or Firm* — Botos Churchill IP Law

(57) ABSTRACT

The technology relates to free-space optical communication systems that correct for errors in tracking and pointing accuracy to maintain connection integrity. Such systems can both proactively and reactively correct for errors in tracking performance and pointing accuracy of terminals within the system. An aspect includes receiving information indicative of at least one external disturbance associated with a communication device. A determination is made for a proactive estimation indicative of a first error associated with an effect of the at least one external disturbance at a current timestep. A determination is made for a reactive estimation indicative of a second error associated with the effect of the at least one external disturbance at a previous timestep. A final control signal is determined based on the proactive estimation and the reactive estimation. A controller is able to actuate an optical assembly of the communication device based on the determined final control signal.

22 Claims, 8 Drawing Sheets

(56) References Cited

U.S. PATENT DOCUMENTS

2005/0196166 A1* 9/2005 Wirth ............... G02B 26/06
398/33
2017/0264365 A1* 9/2017 Takahashi ............ H04B 10/548

OTHER PUBLICATIONS

Gain scheduling—Wikipedia—Gain scheduling—https://en.wikipedia.org/wiki/Gain_scheduling, retrieved from the internet Nov. 28, 2021, pp. 1.

Linear parameter-varying control—Wikipedia, Wikipedia, retrieved from the internet Nov. 28, 2021, pp. 1-4.

Anthonisamy, Arockia Bazil Raj , "Performance analysis of free space optical communication in open-atmospheric turbulence conditions with beam wandering compensation control", IET Journals, vol. 10, Iss. 9, 2016, pp. 1096-1103.

Ding, Min , et al., "Gain Scheduling Control Design of an Erbium-Doped Fibre Amplifier by Pump Compensation", Proceedings of the 2005 IEEE Conference on Control Applications Toronto, Canada, Aug. 28-31, 2005, pp. 510-516.

Ho, Tzung-Hsien , "Pointing, Acquisition, and Tracking Systems for Free-Space Optical Communication Links", Dept. of Electrical and Computer Engineering, 2007, pp. 1-220.

Kaushal, Hemani , et al., "Optical Communication in Space: Challenges and Mitigation Techniques", arXiv:1705.10630v1, 2017, pp. 1-41.

Leith, D.J. , "Survey of Gain-Scheduling Analysis & Design", Dept. of Electronic & Electrical Engineering, University of Strathclyde, 2000, pp. 1-26.

Pasupathi, T. , et al., "Mitigation of low-order atmospheric turbulent effects using sensorless adaptive optics in terrestrial free space optical communication", https://ieeexplore.ieee.org/abstract/document/7603064, 2016, pp. 1-3.

Qin, Yixuan , et al., "Optimised optical burst aggregation by employing dynamic state-space feedback gain scheduling controller", https://ieeexplore.ieee.org/abstract/document/5062457, 2009, pp. 1-3.

Radisavljevic-Gajic, Verica , "Non-linear integral control of photon power transients in optical communication networks with erbiumdoped fibre amplifiers", www.ietdl.org, 2014, pp. 412-420.

Raj, Arockia. Bazil, et al., "Intensity feedback-based beam wandering mitigation in free-space optical communication using neural control technique", Bazil Raj et al. EURASIP Journal on Wireless Communications and Networking 2014, pp. 1-18.

Stefanovic, Nem , et al., "An application of L2 nonlinear control and gain scheduling to erbium doped fiber amplifiers", Control Engineering Practice, vol. 15, Issue 9, 2007, pp. 1107-1117.

* cited by examiner

700

FEEDFORWARD MOTION COMPENSATION FOR FSOC TERMINALS

BACKGROUND

Communication terminals may transmit and receive optical signals or beams through free space optical communication (FSOC) links. In order to accomplish this, such terminals generally use acquisition and tracking systems to establish the optical link by pointing optical beams towards one another. For instance, a transmitting terminal may use a beacon beam to illuminate a receiving terminal, while the receiving terminal may use a position sensor to locate the transmitting terminal and to monitor the beacon beam. Steering mechanisms may maneuver the terminals to point toward each other and to track the pointing once acquisition is established. A high degree of pointing accuracy may be required to ensure that the optical signal will be correctly received.

The tracking performance and pointing accuracy is adversely affected by internal and external disturbances experienced by the communication system, which can include mount vibration, wind effects or fluctuations due to a bird landing on or departing the equipment. In certain optical communication systems that employ wide beamwidth, the adverse effects on the tracking performance and pointing accuracy may be less pronounced. However, for communication systems with narrow beamwidth and a large transmission distance such as on the order of a kilometer or more, errors in tracking performance and pointing accuracy are more pronounced and precise corrections are needed to accommodate them. This means that for systems with narrow beamwidth, connections may be more frequently interrupted or more unreliable due to disturbances as the system reactively corrects for tracking and alignment errors. Additionally, such a system may require additional beacon beam transmissions to assist in tracking which may expend excessive amounts of power.

BRIEF SUMMARY

The technology relates to FSOC systems capable of effectively correcting for errors in tracking and pointing accuracy to maintain connection integrity without or with less frequent beacon beam use. Aspects of the technology allow the FSOC system to both proactively and reactively correct for errors in tracking performance and pointing accuracy of terminals within the system. The use of proactive and reactive methodologies in combination allows for more precise and efficient corrections. Such an approach is particularly beneficial for systems with narrow beamwidth and a large transmission distance, such as on the order of a kilometer or more.

According to one aspect a method is provided for adjusting an optical link alignment of a first communication device with a remote communication device. The method comprises: receiving, at the first communication device, information indicative of at least one external disturbance; determining from the information, by one or more processors of the first communication device, a proactive estimation indicative of a first error associated with an effect of the at least one external disturbance at a current timestep; determining from the information, by the one or more processors of the first communication device, a reactive estimation indicative of a second error associated with the effect of the at least one external disturbance at a previous timestep; determining, by the one or more processors, a final control signal based on the proactive estimation and the reactive estimation; and actuating, by a controller, an optical assembly of the first communication device based on the determined final control signal.

In an example, determining the proactive estimation includes determining the first error, and determining the reactive estimation includes determining the second error. Here, the final signal may be determined by summing the first error and the second error.

In another example, the information indicative of the at least one external disturbance includes behavior information of the remote communication device from the previous timestep. The behavior information may include a set of factors associated with the remote communication device. The set of factors may include at least one of a setpoint of the remote communication device, a pose of the remote communication device, an angular velocity of the remote communication device, acceleration of the remote communication device, or a target location of the remote communication device. Alternatively or additionally, the behavior information may be based on information pertaining to the at least one external disturbance at the previous timestep received from either one or more sensors of the remote communication device or one or more sensors of the first communication device. In one scenario, determining the proactive estimation includes mapping the information from the current timestep to a first output by a feedforward gain scheduling approach and determining the reactive estimation includes mapping the behavior information from the previous timestep to a second output by a feedback gain scheduling approach. Here, the first output is the proactive estimation and the second output is the reactive estimation. In this case, the feedforward gain scheduling approach may be defined by: $u\_FF(t)=G\_FF(m)$, where $u\_FF(t)$ is the first output, t is time, $G\_FF$ is a feedforward function, and m is the information from the current timestep. In another case, the feedback gain scheduling approach is defined by: $u\_FB(t)=G\_FB(m)$, where $u\_FB(t)$ is the second output, t is time, $G\_FB$ is a feedback function, and m is the behavior information from the previous timestep.

According to another example, the method further comprises repeating the steps of receiving the information, determining the proactive estimation, determining the reactive estimation, and determining the final control signal in a plurality of forward timesteps. In this case, the method may include repeating the steps of receiving the information, determining the reactive estimation, and determining the final control signal in a plurality of forward timesteps; wherein the proactive estimation is not determined in at least one forward timestep, and the final control signal in the at least one forward timestep is only based on the reactive estimation. Alternatively or additionally, the method may include repeating the steps of receiving the information, determining the proactive estimation, and determining the final control signal in a plurality of forward timesteps; wherein the reactive estimation is not determined in at least one forward timestep, and wherein the final control signal in the at least one forward timestep is only based on the proactive estimation.

In a further example, actuating the optical assembly of the first communication device based on the determined final control signal includes adjusting a target location or a setpoint location. And in another example, the method further comprises instructing the remote communication device to adjust a target location or a setpoint location based on the determined final control signal.

According to another aspect, a communication device is provided. The communication device comprises a transmitter configured to transmit an outbound optical signal to a remote communication device, a receiver configured to receive an inbound optical signal from the remote communication device, and one or more processors. The processor(s) are configured to: determine a proactive estimation indicative of a first error associated with an effect of at least one external disturbance at a current timestep, determine a reactive estimation indicative of a second error associated with the effect of the at least one external disturbance at a previous timestep, and determine a final control signal based on the proactive estimation and the reactive estimation. The communication device also includes a steering mechanism configured to adjust, when instructed by the one or more processors, the communication device based on the final control signal.

In an example, the proactive estimation and the reactive estimation are determined based on information indicative of the at least one external disturbance. Here, the information indicative of the least one external disturbance includes behavior information of the remote communication device from the previous timestep. The one or more processors may be further configured to: map information from the current timestep to a first output by a feedforward gain scheduling approach and map the behavior information from the previous timestep to a second output by a feedback gain scheduling approach. In this case, the first output is the proactive estimation and the second output is the reactive estimation. In one scenario here, the feedforward gain scheduling approach may be defined by: u_FF(t)=G_FF(m), where u_FF(t) is the first output, t is time, G_FF is a feedforward function, and m is the information from the current timestep. Alternatively, the feedback gain scheduling approach may be defined by: u_FB(t)=G_FB(m), where u_FB(t) is the second output, t is time, G_FB is a feedback function, and m is the behavior information from the previous timestep. In further examples according to any of the above configurations, the communication device may be stationary or mobile.

DETAILED DESCRIPTION

Figure 1:
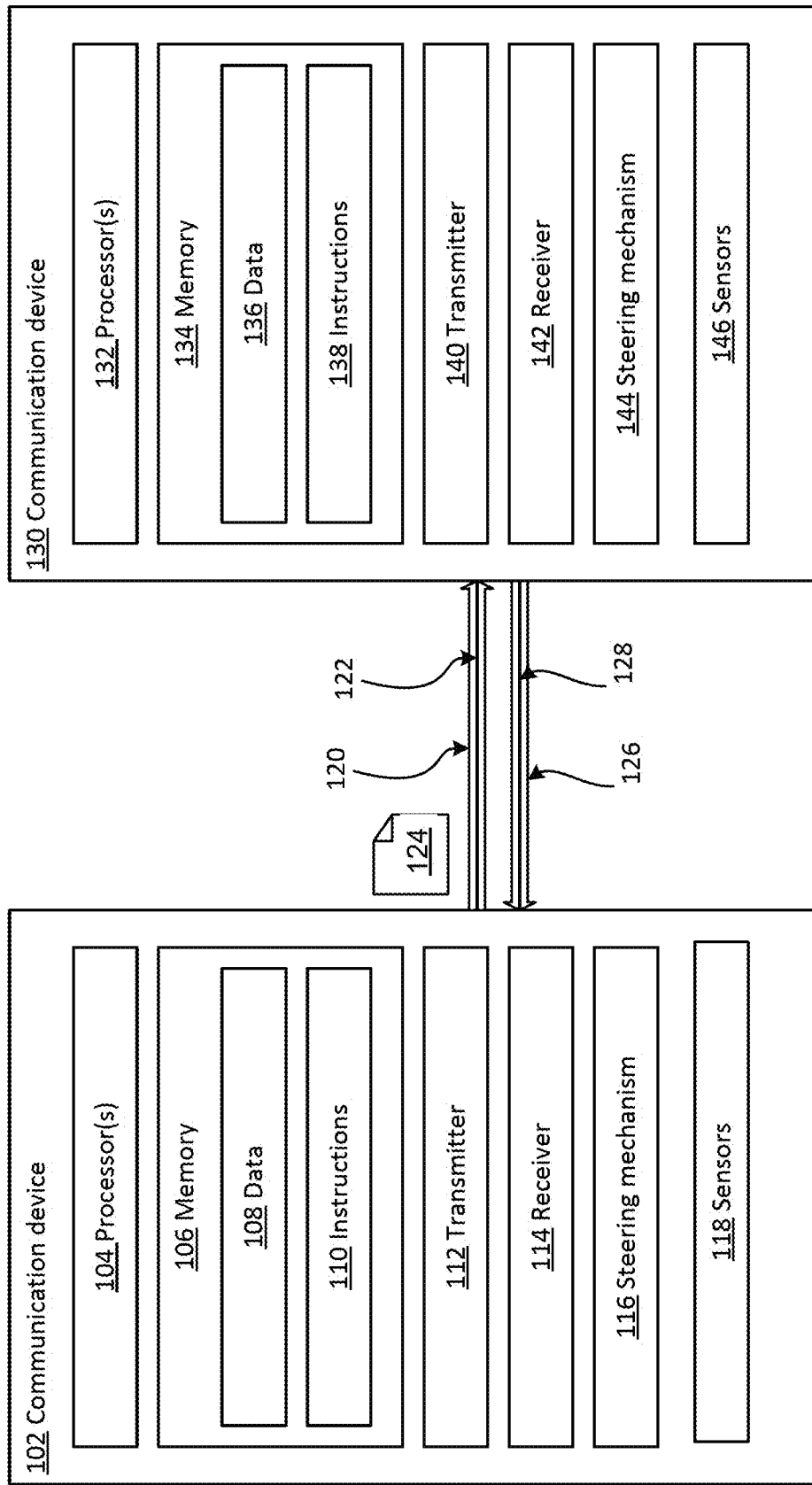
FIG. 1 is a block diagram of a first communication device and a second communication in accordance with aspects of the disclosure.

Implementations of the present disclosure are described in detail with reference to the drawing figures wherein like reference numerals identify similar or identical elements. It is to be understood that the disclosed implementations are merely examples of the disclosure, which may be embodied in various forms. Specific structural and functional details disclosed herein are not to be interpreted as limiting, but merely as a basis for the claims and as a representative basis for teaching one skilled in the art to variously employ the present disclosure in virtually any appropriately detailed structure.

Example Systems

FIG. 1 is a block diagram 100 of a first communication device of a first communication terminal configured to form one or more links with a second communication device 122 of a second communication terminal, for instance as part of a system such as an FSOC system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any hardware-based processors, such as commercially available CPUs. Alternatively, the one or more processors may be a dedicated device such as an application specific integrated circuit (ASIC) or other hardware-based processor, such as a field programmable gate array (FPGA). In one aspect, the processor(s) 104 may be configured to make estimations associated with the tracking behavior of a remote device (e.g., a second communication device 130 or client device). The estimation being indicative of where the remote terminal will be at a given forward timestep. The processor(s) 104 may implement various modules (e.g., feedforward module 602, feedback module 606 as discussed below with respect to FIG. 6) when making tracking behavior estimations. Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications data and/or beacon information.

As shown in FIG. 1, the transmitter 112 of the first communication device 102 is configured to output a beacon beam 120 to establish a communication link 122 with the second communication device 130, which receives the beacon beam 120. The first communication device 102 may align the beacon beam 120 co-linearly with the optical communication beam (not shown) that may have a narrower solid angle or the same angle as the beacon beam 120 and carries a communication signal 124. As such, when the second communication device 130 receives the beacon beam 120, the second communication device 130 may establish a line-of-sight link with the first communication device 102 or otherwise align with the first communication device. As a result, the communication link 122 that allows for the transmission of the optical communication beam (not shown) from the first communication device 102 to the second communication device 130 may be established. Alternatively, the transmitter of the first communication device 102 may be configured to establish a communication link with the second communication device 130 without utilization of a beacon beam.

Figure 2A:
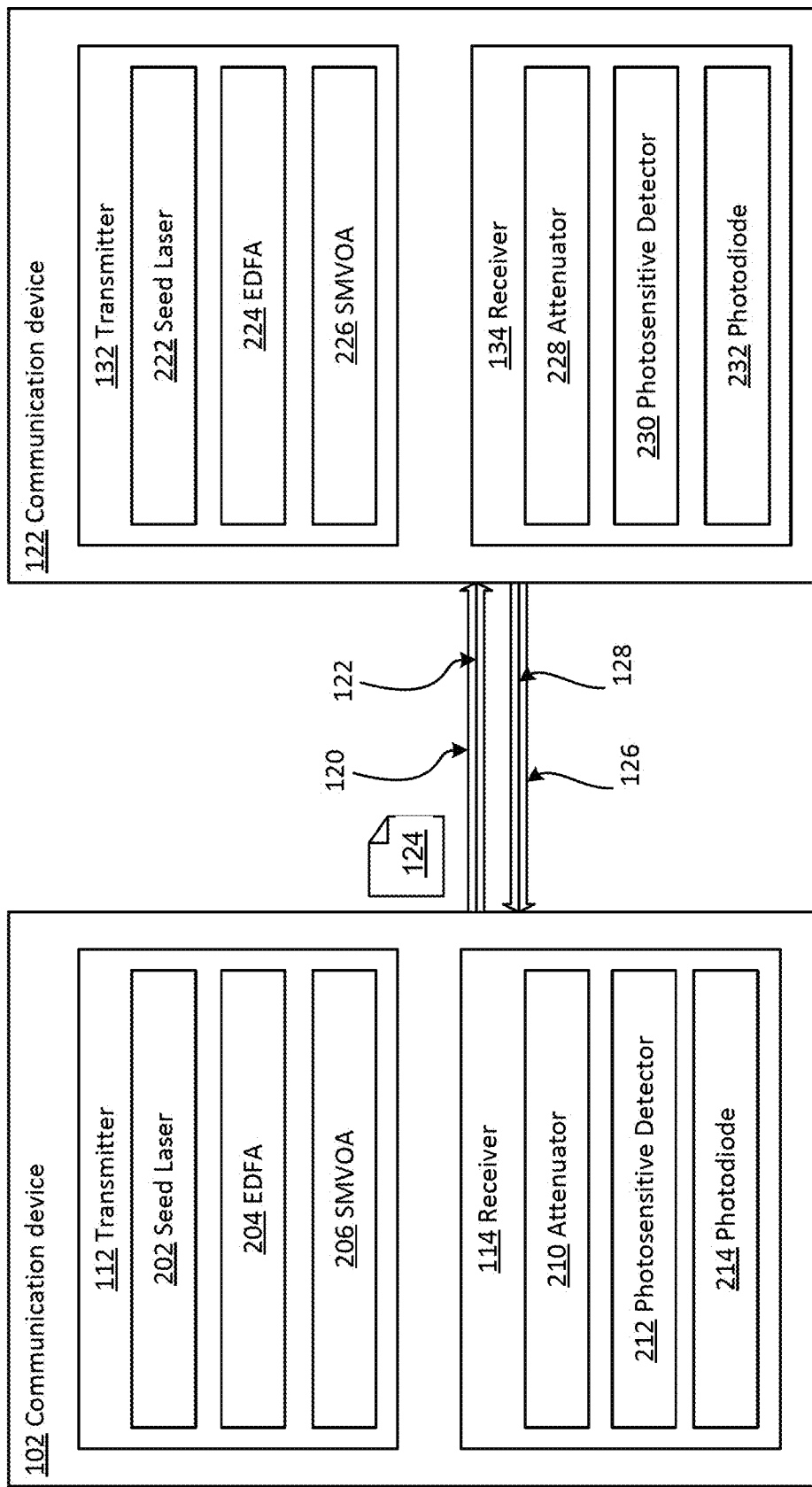
FIGS. 2A-B are diagrams of components of the first communication device and the second communication device in accordance with aspects of the disclosure.
Figure 2B:
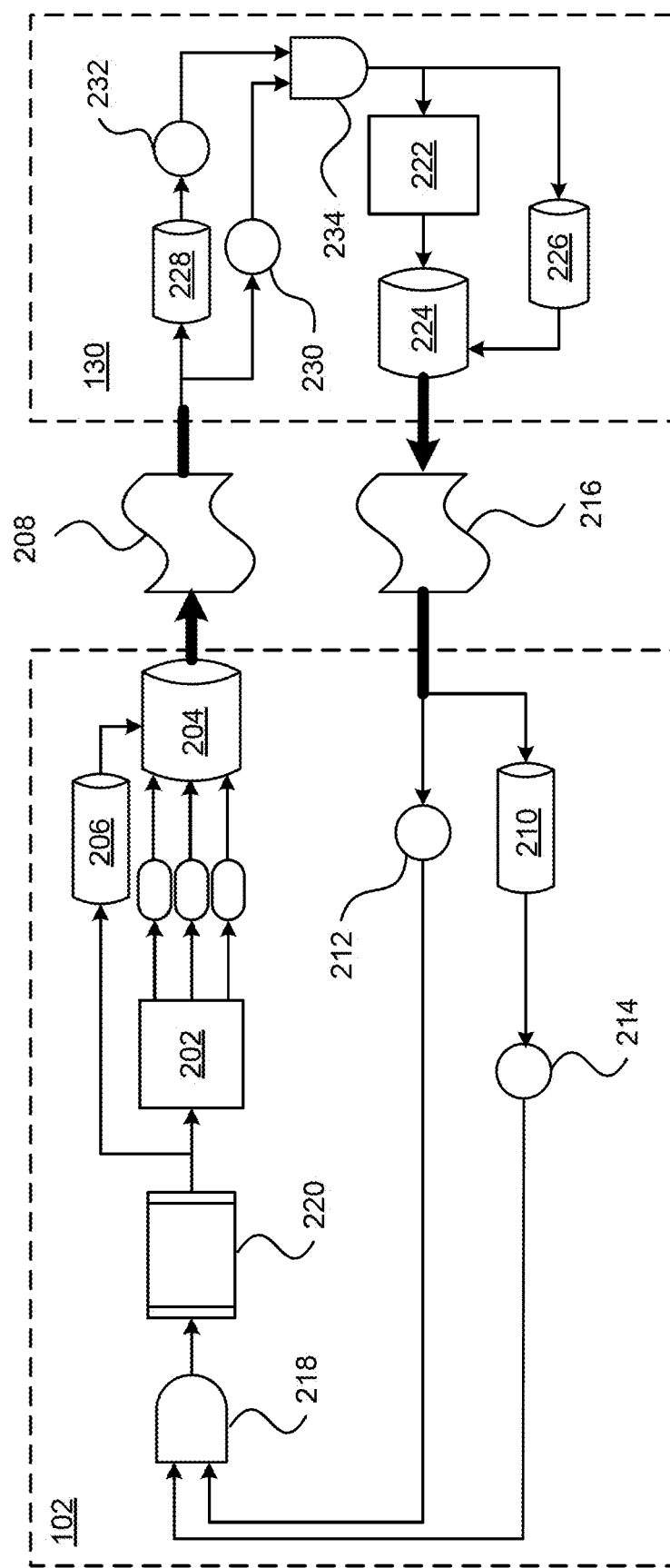

According to one aspect, the transmitter 112 includes an optical transmitter, an amplifier, and an attenuator. As shown in the example configuration illustrated in the block and system diagrams of FIGS. 2A-B, the transmitter 112 includes a seed laser 202 configured to provide an amount of bandwidth for one or more output signals, an amplifier 204 such as an Erbium-doped fiber amplifier (EDFA) configured to increase an amplitude of the output signal(s), and an attenuator 206 such as a variable optical attenuator (VOA) that may be a single mode variable optical attenuator (SMVOA) or a multi-mode VOA (MMVOA) that is configured to decrease the amplitude of the output signal. As illustrated in FIG. 2B, the output of the attenuator 206 is fed into the amplifier 204 along with the seed laser output signals. Via this architecture, the transmitter 112 may be configured to output the beacon beam 120 that allows one communication device to locate another, as well as one or more communication signals over one or more communication links 122. In addition, as shown in FIG. 1, the transmitter 112 is configured to output beacon beam 120 that allows one communication device to locate another, as well as a communication signal over communication link 122. The output signal from the transmitter 112 may therefore include the beacon beam 120, the communication signal(s), or both. The communication signal(s) may be a signal configured to travel through free space, such as, for example, a radio-frequency (RF) signal or optical signal, as shown by propagation path 208. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 120 may illuminate a larger solid angle in space than the optical communication beam used in the communication link 122, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian. Alternatively, if the first communication device 102, the second communication device 130, or both already know the location of the other, a beacon beam carrying a beacon signal may not be needed. In such a scenario, the transmitter 112 of the first communication device 102 may send the communication link 122 without the beacon beam 120.

The receiver 114 includes a tracking system configured to detect an optical signal. As shown in the example of FIGS. 2A-B, the receiver 114 for the optical communication system may include an attenuator 210 such as a multi-mode variable optical attenuator configured to adjust an amplitude of a received signal, a photosensitive detector 212, and/or a photodiode 214. Using the photosensitive detector 212, the receiver 114 is able to detect a signal location and convert the received optical signal from propagation path 216 into an electric signal using the photoelectric effect. The receiver 114 is able to track the received optical signal, which may be used to direct the steering mechanism 116 to counteract disturbances due to scintillation and/or platform motion. The system may process the signal output from the photosensitive detector 212 by, e.g., performing integration, low-pass filtering and/or window-based sampling. In the example of FIG. 2B, the resultant signal is combined with output from the attenuator 210 and photodiode 214 at block 218. The combined signal may then be processed by a controller 220, and its output controls operation of the seed laser 202 and attenuator 206. For instance, each communication channel could be adjusted independently as well, for example, by adjusting the seed laser powers for each channel.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezoelectric 2-axis mirror. The steering mechanism 116 may be configured to steer the transmitter, receiver, and/or optical signal in at least two degrees of freedom, such as, for example, yaw and pitch. The adjustments to the pointing direction may be made to acquire or align a communication link, such as communication link 122, between the first communication device 102 and the second communication device 130. To perform a search for a communication link, the one or more processors 104 may be configured to use the steering mechanism 116 to point the transmitter 112 and/or the receiver 114 in a series of varying directions until a communication link is acquired.

In addition, the adjustments may optimize transmission of light from the transmitter 112 and/or reception of light at the receiver 114.

The one or more processors 104 are also in communication with the one or more sensors 118. The one or more sensors 118, may be configured to monitor a state of the first communication device 102. In some implementations the one or more sensors may include standalone inertial measurement devices such as accelerometers and/or gyroscopes configured to measure or estimate selected forces. In some implementations, the one or more sensors may be integrated in an inertial measurement unit (IMU) having one or more accelerometers, magnetometers, and/or gyroscopes configured to measure one or more of pose, angle, velocity, angular velocity, etc., or other sensors having one or more encoders or other components able to measure or estimate torques as well as other forces. In addition, the sensor(s) 118 may include one or more sensors configured to measure various environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 130 includes one or more processors 132, memory 134 storing data 136 and instructions 138, a transmitter 140, a receiver 142, a steering mechanism 144, and one or more sensors 146. The one or more processors 132 may be similar to the one or more processors 104 described above. Memory 134 may store information accessible by the one or more processors 132, including data 136 and instructions 138 that may be executed by processor 124. Memory 134, data 136, and instructions 138 may be configured similarly to memory 106, data 108, and instructions 110 described above. In addition, the transmitter 140, the receiver 142, the steering mechanism 144 and the sensors 146 of the second communication device 130 may be similar to the transmitter 112, the receiver 114, and the steering mechanism 116 described above.

Like the transmitter 112, transmitter 140 may include an optical transmitter, an amplifier, and an attenuator. As shown in FIG. 2, the transmitter 140 includes a seed laser 222 configured to provide an amount of bandwidth for an output signal(s), an amplifier 224 such as an EDFA configured to increase an amplitude of the output signal, and an attenuator 226, e.g., a SMVOA or MMVOA configured to decrease the amplitude of the output signal. As shown in FIG. 2, amplifier 224 causes the output signal to be sent along the propagation path 216. As noted above for communication device 102, each communication channel sent from communication device 130 could be adjusted independently as well, for example, by adjusting the seed laser powers for each channel. Additionally, as shown in FIG. 1, transmitter 140 may be configured to output both an optical communication beam and a beacon beam. For example, transmitter 140 of the second communication device 130 may output a beacon 126 to establish a communication link 128 with the first communication device 102, which receives the beacon beam 126. The second communication device 130 may align the beacon beam 126 co-linearly with the optical communication beam (not shown) that has a narrower solid angle than the beacon beam and carries another communication signal. As such, when the first communication device 102 receives the beacon beam 126, the first communication device 102 may establish a line-of-sight with the second communication device 130 or otherwise align with the second communication device. As a result, the communication link 128, that allows for the transmission of the optical communication beam (not shown) from the second communication device 130 to the first communication device 102, may be established. Alternatively, if the first communication device 102, the second communication device 130, or both already know the location of the other, a beacon beam carrying a beacon signal may not be needed. In such a scenario, the transmitter 140 of the second communication device 130 may send the communication link 128 without the beacon beam 126.

Like the receiver 114, the receiver 142 includes a tracking system configured to detect an optical signal as described above with respect to receiver 114. As shown in FIG. 2A, the receiver 114 for the optical communication system may include an attenuator 228, such as a single mode or multi-mode variable optical attenuator configured to adjust an amplitude of a received signal, a photosensitive detector 230, and/or a photodiode 232. Other components similar to those pictured in the first communication device 102 may also be included in the second communication device 130. Using the photosensitive detector 230, the receiver 142 is able to detect a signal location and convert the received optical signal into an electric signal using the photoelectric effect. The receiver 142 is able to track the received optical signal, which may be used to direct the steering mechanism 144 to counteract disturbances due to scintillation and/or platform motion.

Returning to FIG. 1, the one or more processors 124 are in communication with the steering mechanism 144 for adjusting the pointing direction of the transmitter 140, receiver 142, and/or optical signal, as described above with respect to the steering mechanism 116. The adjustments to the pointing direction may be made to establish acquisition and connection link between the first communication device 102 and the second communication device 130. In addition, the one or more processors 132 are in communication with the one or more sensors 146 as described above with respect to the one or more sensors 118. The one or more sensors 146 may be configured to monitor a state of the second communication device 130 in a same or similar manner that the one or more sensors 118 are configured to monitor the state of the first communication device 102.

As shown in FIG. 1, the communication links 122 and 128 may be formed between the first communication device 102 and the second communication device 130 when the transmitters and receivers of the first and second communication devices are aligned, or in a linked pointing direction. Using the communication link 122, the one or more processors 104 can send communication signals to the second communication device 130. Using the communication link 128, the one or more processors 132 can send communication signals to the first communication device 102. In some examples, it is sufficient to establish one communication link between the first and second communication devices 102, 130, which allows for the bi-directional transmission of data between the two devices. The communication links in these examples are FSOC links. In other implementations, one or more of the communication links may be RF communication links or other type of communication link capable of traveling through free space.

Example Terminal Configuration

Figure 3:
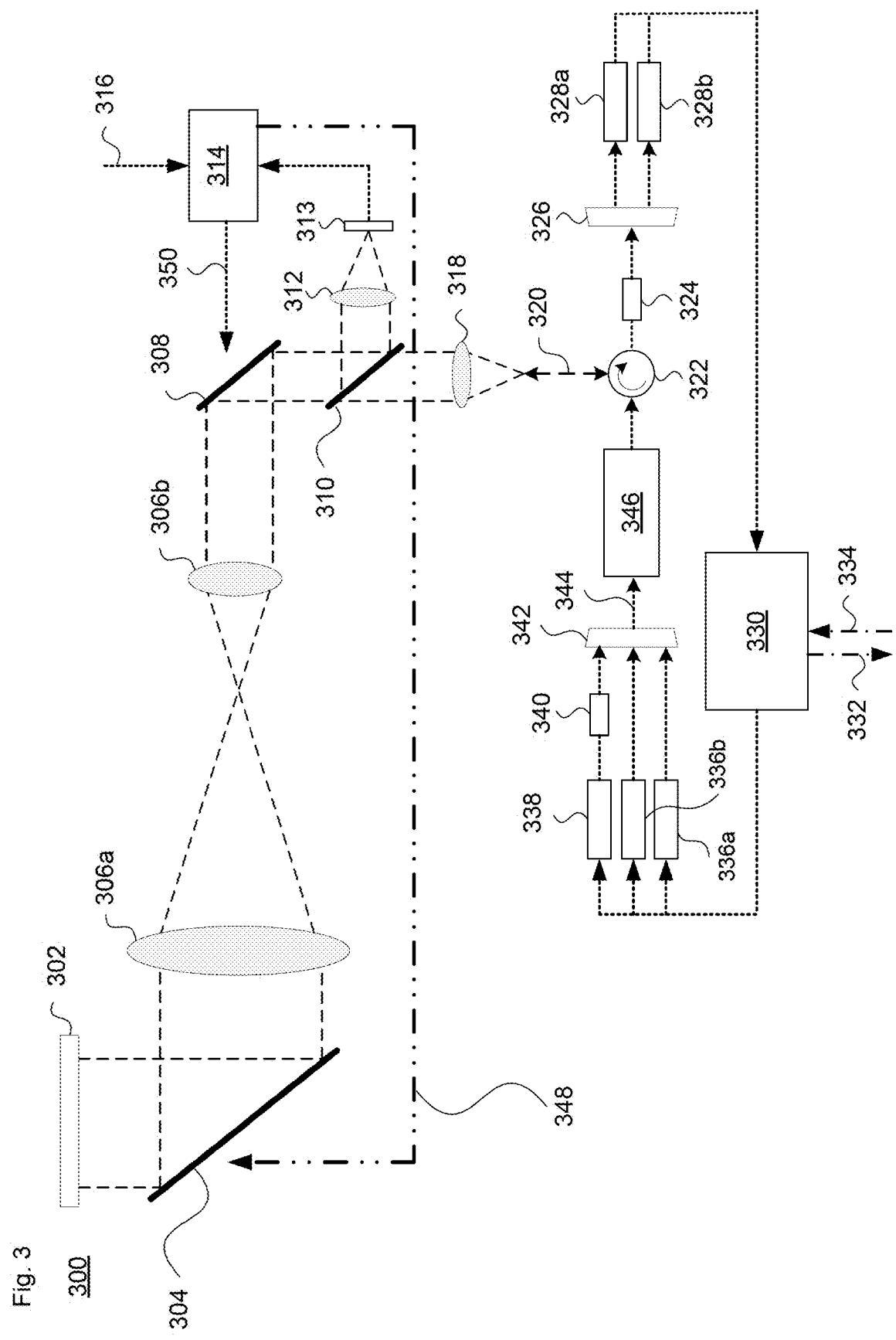
FIG. 3 illustrates a block diagram for an FSOC terminal in accordance with aspects of the technology

FIG. 3 illustrates a block diagram of an example configuration 300 for an FSOC terminal for use with aspects of the technology. While not intending to be limiting in any manner, in this example the terminal may have a monostatic design with a single 75 mm clear aperture for optical transmission and reception. Here, the terminal may emit three (or more) laser wavelengths (e.g., two (or more) for 10 Gbps telecom signals, and one beacon dedicated to tracking), and similarly receives three (or more) laser beams at different wavelengths (all of which may be within 100 nm of 1550 nm). Note that the signals transmitted on each wavelength may have different throughput and/or different modulation formats. Dashed lines in FIG. 3 indicate paths of laser beams received by and output from the terminal.

The receiver path is as follows. Three laser beams are incident on a terminal aperture window 302, which is desirably hydrophobically- and anti-reflection-coated, and then on a coarse pointing mirror (CPM) 304. The beams reflected off the CPM 304 go through a telescope with approximately 40× demagnification. The telescope in this example includes a first lens 306a and a second lens 306b. At the conjugate plane in the demagnified space, the beams are incident on a fast steering mirror (FSM) 308.

After reflecting off of the mirror 308, the beams are incident on a dichroic beam splitter 310, which reflects the beacon wavelength and transmits the two communications laser beams. The beacon laser that reflects off of the dichroic mirror is focused by lens 312 onto a position-sensing detector (PSD) 313, from which the center of the focused spot on the sensor plane can be calculated by a pointing, acquisition and tracking (PAT) module 314, such as a DSP. This input and information from one or more external sensors, as shown by dotted arrow 316, is used by the PAT module 314 as feedback for adjusting the pointing direction of the two mirrors (the CPM 304 and FSM 308). The beacon laser may be modulated at a low frequency (e.g., on the order of 1-3 KHz, or more or less) to allow for optical background and clutter rejection via narrowband filtering around the modulation frequency in the receiver processing chain, prior to computing the center of the signal beam.

The telecommunications beams (two wavelengths) that are transmitted through the dichroic beam splitter 310 are focused onto a fiber such as a multimode receiver fiber (dashed double arrow 320) via a collimator lens 318. The fiber-coupled beams are directed through a circulator 322 towards the receiver photonics components. Here, the beams may be first conditioned via an actively-controlled multi-mode variable optical attenuator (VOA) 324 to ensure the incident power on the downstream photodetectors are at an optimal threshold. Next, the telecommunications wavelengths are demultiplexed and filtered at block 326, and then detected via high-bandwidth and high-sensitivity avalanche photodiodes at blocks 328a and 328b. Post detection, the signals may be amplified, conditioned, and converted to bits via clock and data recovery (not shown). At block 330, a high-speed modem processor is configured to extract the data packets from the communication signals (e.g., Ethernet-type telecommunication signals) and send them out on one or more fiber-optic client ports 332.

The transmitter path is predominantly the reverse of the receiver path. For instance, client-side Ethernet or other communication traffic enters the terminal through one or more fiber optic ports 334. At block 330, the modem processor is configured to structure packets into frames that are optimized for transmission over the wireless optical channel. The frames of each communication channel are processed independently and then intensity modulated onto two seed lasers at block 336a and 336b. Beacon power can be adjusted relative to the communication beams via a variable optical attenuator (VOA) 340. The two laser beams, along with beacon laser beam generated at block 338 prior to VOA 340, are combined in a multiplexer 342. The combined three wavelengths in a single mode fiber (shown as dotted arrow 344) are amplified in an Erbium-doped optical amplifier (EDFA) 346, and then propagated into the third port of the circulator 322, such that they are emitted into free space from the same port that receives the light in the receiver path via terminal aperture window 302.

In this example configuration, the circulator 322 has three ports: a dual single- and multi-mode core bidirectional port that faces free space, a multimode receiver output port, and a single-mode transmitter input port. This circulator enables the system to operate in a monostatic configuration with single-mode transmission, yet, multimode reception, which is advantageous for terrestrial communications wherein the atmosphere causes significant wavefront and irradiance distortions. The three transmit beams traverse the optical path inside the terminal in the opposite direction, reflecting off the FSM 308 and the CPM 304, and then exit the terminal through the aperture 302. Dash-dot arrow 348 indicates that the PAT module 314 is configured to adjust the CPM 304, and dotted arrow 350 indicates that the PAT module 314 is also configured to adjust the FSM 308.

In one example, the line of sight between two terminals can be maintained by two-stage active tracking. The Coarse Pointing Mirror (CPM 304 in FIG. 3) has a primary responsibility to compensate for disturbances that are large in angle (e.g., on the order of degrees) but rather low in frequency (e.g., on the order of 1 Hz or lower). Examples include mount motion due to diurnal temperature changes or low frequency swaying of the pole due to wind. The fast steering mirror (FSM 308 in FIG. 3) compensates for disturbances that are high in frequency (~tens of Hz), but small in absolute angular range (e.g., on the order of tens-to-hundreds of $\mu$ rads). Examples include vibrations from nearby equipment or higher frequency excitations in the mounting structure from wind.

A controller (e.g., of PAT module 314) for the two-stage active tracking system can be described by the example 300 in the block diagram of FIG. 3. The tilt angle of beams entering a terminal have one-to-one correspondence to the center of the spot incident on the position-sensing detector (313 in FIG. 3). The signals obtained by this detector are first passband-filtered around the modulation frequency to reject out-of-band background and clutter, then demodulated to baseband, followed by processing to estimate the center of the spot. These estimates inform the controller (PAT module 314) of changes to the incidence angle of the beams arriving from the remote terminal due to platform motion ($\theta p(t)$) as well as atmospheric beam wander ($\theta c(t)$). A proper integration time is necessary to obtain estimates with adequate signal-to-noise ratio. In one scenario, the beam-center estimates may be updated at the rate of hundreds of Hz, or more or less.

The difference between the beam-center estimate and the target tracking location on the position-sensing detector (corresponding to the optical boresight of the system) is the error signal that is input to the controller of PAT module 314. This controller is configured to command signals for the FSM 308 and CPM 304 of the pointing assemblies to try to drive the error signal to zero (or otherwise as low as possible). The resulting actuation of these two mirrors changes the arrival (and departure) angle of the laser beams (see resultant pointing angle $\theta(t)$) and closes the feedback loop.

According to one scenario, the terminals providing free-space optical communication can be deployed as telecommunications devices that pass traffic arriving through the fiber-optic client Ethernet ports. For instance, there may be multiple communication channels, each running 10G-base Ethernet independently from input to output. The modem core may employ forward error correction and hybrid automatic repeat request (ARQ) to ensure robust communication through the turbulent atmosphere. Note that there may be separate modem instances for each channel.

Example Communication System Configuration

Figure 4:
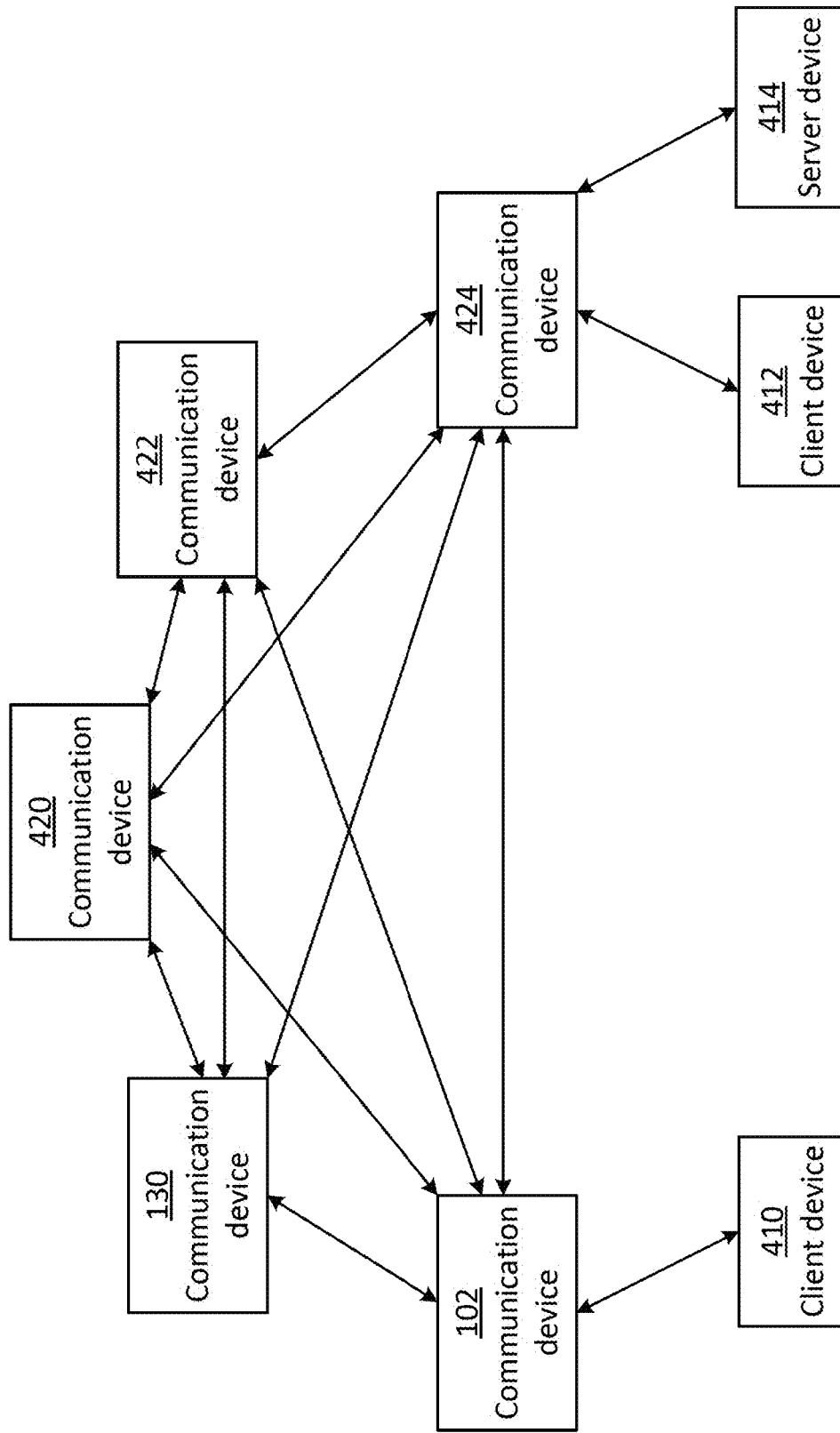
FIG. 4 is a pictorial diagram of an example network in accordance with aspects of the disclosure.

As shown in FIG. 4, a plurality of communication devices, such as the first communication device 102 and the second communication device 130, may be configured to form a plurality of communication links (illustrated as arrows) between a plurality of communication terminals, thereby forming a network 400. The network 400 may include client devices 410 and 412, server device 414, and communication devices 102, 130, 420, 422, and 424. Each of the client devices 410, 412, server device 414, and communication devices 420, 422, and 424 may include one or more processors, a memory, a transmitter, a receiver, and a steering mechanism similar to those described above. Using the transmitter and the receiver, each communication device in network 400 may form at least one communication link with another communication device, as shown by the arrows. The communication links may be for optical frequencies, radio frequencies, other frequencies, or a combination of different frequency bands. In FIG. 4, the communication device 102 is shown having communication links with client device 410 and communication devices 130, 420, and 422. The communication device 130 is shown having communication links with communication devices 102, 420, 422, and 424. Each client device may be able to communicate with another client device and/or with a server device via one or more intermediary communication devices.

The network 400 as shown in FIG. 4 is illustrative only, and in some implementations the network 400 may include additional or different communication terminals. The network 400 may be a terrestrial network where the plurality of communication devices is on a plurality of ground communication terminals. In other implementations, the network 400 may include one or more high-altitude platforms (HAPs), which may be balloons, blimps or other dirigibles, airplanes, unmanned aerial vehicles (UAVs), or any other form of high-altitude platform such as those configured to operate in the stratosphere, or other types of moveable or stationary communication terminals. Additionally or alternatively, one or more communication devices may be satellites orbiting the Earth. In some implementations, the network 400 may serve as an access network for client devices such as cellular phones, laptop computers, desktop computers, wearable devices, or tablet computers. The network 400 also may be connected to a larger network, such as the Internet, and may be configured to provide a client device with access to resources stored on or provided through the larger computer network, such as a cloud computing network that may comprise one or more remote server arrays.

Example Methods

In addition to the aspects described above and illustrated in the figures, various operations will now be described. It should be understood that the following operations do not have to be performed in the precise order described below. While maintaining a communication link, the one or more processors 104 if the first communication device 102 are configured to track a remote device (e.g., second communication device 130 or a client device). Tracking the remote device includes adjusting a control input, such that actuators of the mirrors will effectively track a target location or setpoint of a beam to ensure maintenance of connection integrity of the communication link. The methodology described herein is configured to function whether the first communication device 102 is stationary or mobile.

To track the remote device, the one or more processors 104 of the first communication device 102 are configured to make corrections or adjustments due to internal and external disturbances, which cause errors associated with the tracking behavior of the remote communication device. Correcting for errors includes making estimations being indicative of where the remote terminal will be at a given forward timestep. Such estimations or other corrections may be both proactive and reactive.

The one or more processors 104 may make a proactive, feedforward estimation based on information pertaining to external disturbances (e.g., wind measurement, mount motion measurement) received from the one or more sensors 146 of the second communication deceive 130, the one or more sensors 118 of the first communication device 102, or both. The information (e.g., measurement of the disturbance, or measurement of the effect of the disturbance) may be obtained from, for example, an IMU such as described above, including a gyroscope or an accelerometer of the one or more sensors 118,146. The information may be from the current timestep. The proactive estimation may involve calculating the pose or other positioning, angular velocity, acceleration, or any combination thereof of the second communication device 130 based on the obtained information. The information, the pose/positioning, angular velocity, acceleration, or any combination thereof may then be used to determine an estimated location and of the second communication device 130 at the next timestep. In determining the estimated location, the one or more processors 104, may calculate a first error. The first error is indicative of the effects of the disturbances on the location of the second communication device 130 at a forward timestep. In implementations where the first communication device is mobile, additional inputs such as, for example, linear velocity, acceleration or global positioning system (GPS) readings may be implemented in the feedforward estimation.

In some implementations, the one or more processors 104 utilize a gain scheduling approach in the determination of the proactive estimation. This involves modeling the remote communication device's behavior based on a mapping of input factors to an output through a deterministic or dynamic mapping, where the output is a function of the input factors. The function may be a transfer function capable of modeling the behavior of the second communication device 130. For example, the one or more processors 104 may map the input factors, to the output, u_FF, by means of a feedforward function G_FF such that:

$$u\_FF(t)=G\_FF(m);$$

where t is time and m is one or more input factors. The function G_FF may be a scaling of the input factors such as m*G where G is static or dynamic gain; G_FF may also be a general algebraic function such as f(m). G_FF may also take the form of m*T where T is a transfer function that relates to an approximation of the system dynamics, sensor dynamics, etc. The function of the input factors may include a piecewise where certain portions of the function output a zero or turn off for certain smaller input values. For example, the function may be a piecewise lookup table where G_FF (m)=m*G and G=2 for an input in (0,1) and G=3 for an input in (1,3), G=0 for an input of <1 (turned off for smaller input values), etc.

In such an implementation utilizing gain scheduling, the input factors, m, used may include the information pertaining to external disturbances. The output of the mapping is indicative of the estimated location of the second communication device 130 (e.g., the pose, angular velocity, acceleration, or any combination thereof) or the location itself at the next timestep and the first error.

The one or more processors 104 may make a reactive, feedback-based estimation according to behavior of the remote terminal at the current and previous timestep(s), in which the behavior is indicative of external disturbances. The behavior may include factors such as the remote terminal's location (e.g., the setpoint), pose, angular velocity, acceleration, and the previous setpoint or target location. The behavior is based on information pertaining to external disturbances (e.g., wind measurement, mount motion measurement) received from the one or more sensors 146 of the second communication deceive 130, the one or more sensors 118 of the first communication device 102, or both from at least one previous timestep. The behavior information may then be used to determine an estimated position of the second communication device 130 at the next timestep. In determining the estimated location, the one or more processors 104, may calculate a second error, the second error being indicative of the effects of the disturbances on the location of the second communication device 130 at the current timestep. The reactive estimation may implement a gain scheduling approach in the determination of the reactive estimated location and the second error similar to the one discussed above with respect to the proactive prediction. In such an implementation, the one or more processors may utilize a feedback function G_FB such that:

$$u\_FB(t)=G\_FB(m);$$

where u_FB is the output; t is time, and m is the input factors. The gain scheduling input factors may include, for example, the behavior information. Moreover, in implementations where the first communication device is mobile, additional inputs such as, for example, linear velocity, acceleration or GPS readings may be implemented in the feedback estimation.

The one or more processors 104 may determine a final control signal based on the proactive and reactive estimations. The final control signal includes accounting for the first error and the second error. In some implementations, the final control signal may be determined by, for example, summing the first error and the second error. When the output functions u_FF and u_FB are the first and second error respectively, the final control signal may be represented by:

$$u\_F=u\_FF+u\_FB;$$

where u_F is the final control signal. In some implementations u_F, u_FF, and u_FB are control inputs that may be fed to a controller of a communication device (e.g., of PAT module 314). Using the final control signal, the one or more processors 104 of the first communication device 102 may adjust the control input of the actuators. In some implementations, the one or more processors 104 may only determine a first error or only determine a second error. In such cases, the final control signal is the same as the first error or the second error, depending on which is determined. Either determination may be throttled on and off at any timestep.

Using the control input from the one or more processors 104, the controller (e.g., of PAT module 314) may send a control signal to actuators of steering mechanism 116 of the first communication device 102 that allows the actuators to effectively track the target or setpoint location. For example, the control signal may cause actuators to make an adjustment. The adjustment may include, the controller instructing the steering mechanism 116 to adjust the target location, or setpoint of the sensor at the receiver 114, the transmitter 112, or both. This adjustment may be achieved by steering the mirrors of the first communication device 102 or by otherwise shifting the setpoint by shifting a phase of a generated signal at the sensor. In some implementations, the first communication device 102 may instruct a controller of the second communication device 130 or client device to perform an adjustment in addition to, or instead of the adjustment performed by the first communication device 102. In either scenario, the mirror(s) of either communication device may be steered on multiple axes. The one or more processors 104 may repeat the first error, second error, and final control signal determinations at each successive timestep. The timesteps may be every 0.1 or 1.0 seconds or more or less.

Figure 5:
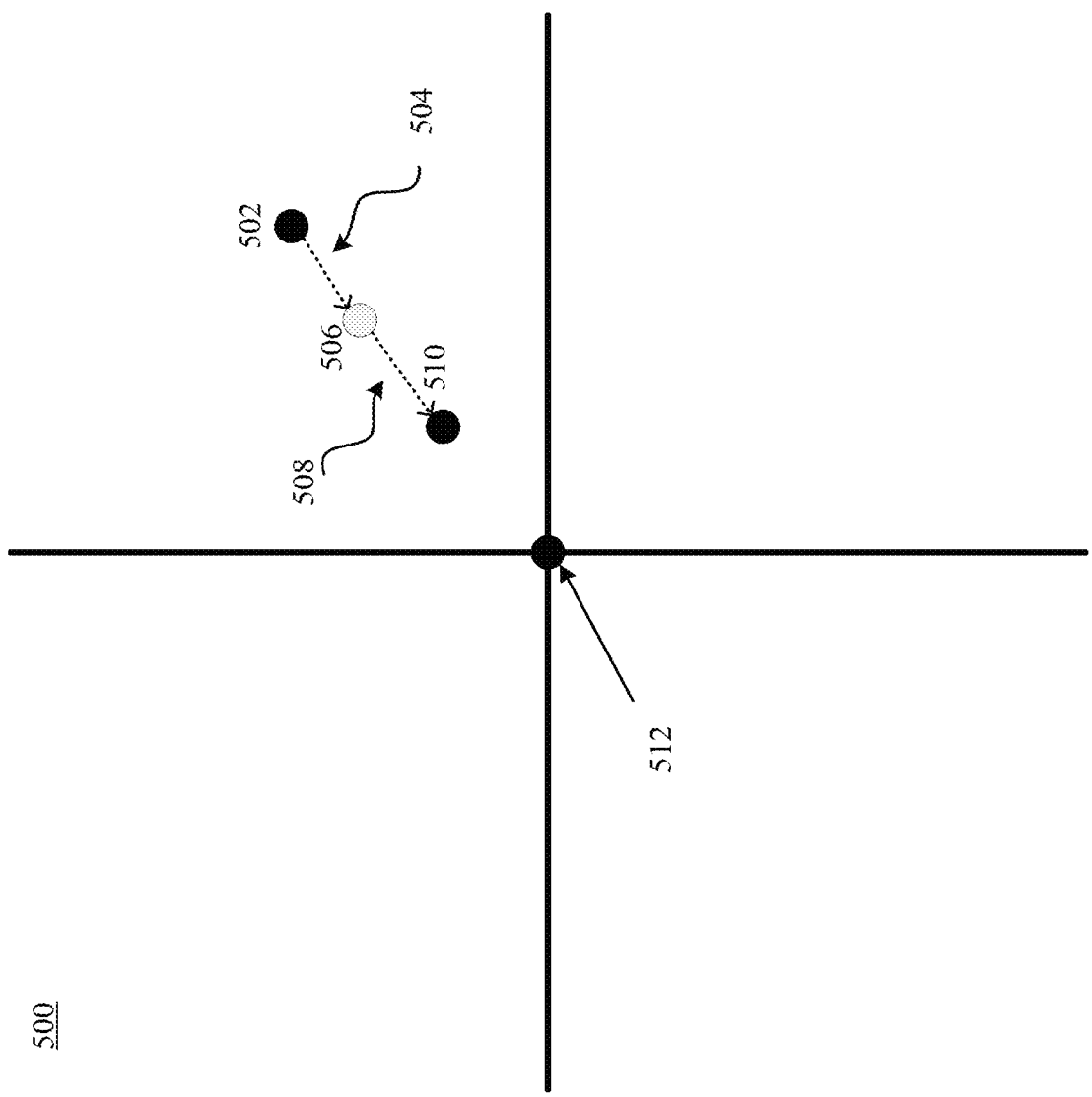
FIG. 5 is a pictorial diagram of results of a performed correction in accordance with aspects of the disclosure.

FIG. 5 illustrates an example 500 of adjusting the setpoint or target location based on the control input from the one or more processors 104. Position 502 represents the setpoint at the previous timestep. The one or more processors 104 may make a first adjustment 504 from position 502 to position 506 based on the first error. The one or more processors may then make a second adjustment 508 from position 506 to position 510 based on the second error. Position 510 corresponds to the position when both the first error and the second error are accounted for (i.e., the setpoint accounting for the final control signal at the current timestep). Each adjustment is such that the final position 510 is closer to a zero-error position 512 than position 502 from the previous timestep. The actuator of the steering mechanism 116 and/or 144 may or may not make separate first and second adjustments 504,508 from position 502 to position 506 to position 510. actuator of the steering mechanism 116 and/or 144 may make one adjustment equivalent to the first adjustment 502 and the second adjustment 508 directly from position 502 to position 480.

Figure 6:
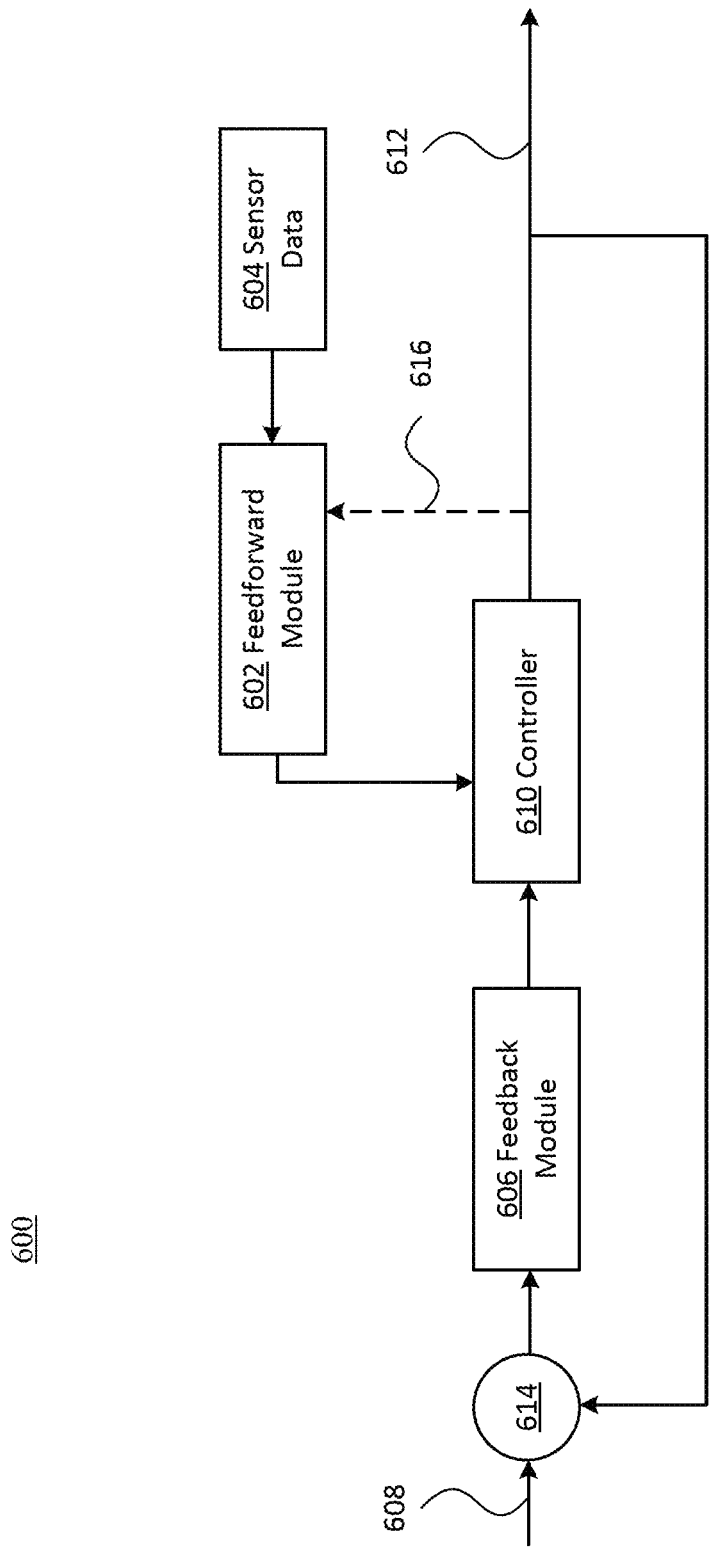
FIG. 6 illustrates an example motion compensation approach in accordance with aspects of the disclosure.

FIG. 6 illustrates an example motion compensation approach 600 in accordance with the above methodology. At a particular timestep, feedforward module 602 receives sensor data 604 for use in the determination of the proactive estimation. According to one aspect of the technology, the sensor data 604 is obtained by the device's IMU. Feedback module 606 receives behavior information pertaining the remote communication device's current and previous velocity, acceleration, and location (e.g., input setpoint 608). The feedforward module outputs the first error and the feedback module outputs the second error. The first and second errors are used to create a control input which is received by controller 610 such that controller 610 may send a control signal 612 indicative of the tracking error to the steering mechanism 116 and/or 144. In this approach, the tracking error is added to the input information 608 at node 614, and may also be supplied to feedforward module 602 as shown by dashed arrow 616.

This proactive or predictive control system approach is able to lead to a higher degree of tracking error reduction than a purely reactive systems, given that it is configured to compensate for errors before they are observed by the device's control system. According to one aspect, proactive control uses the information from the IMU (including its gyroscopes), which can anticipate impacts from rotational terminal motion due to terrestrial (e.g., mount vibration) or aerial (e.g., wind, birds landing, etc.) sources.

The system may switch between scheduled and adaptive gains. Scheduled gain is a way to eliminate the impact of higher-than desired gyroscope noise, which may occur in low-cost components, causing higher tracking noise, during low-rate platform motion well within the feedback system's compensation capability. When platform angular velocities begin to pass beyond the feedback system's compensation capability (e.g., of feedback module 606), the obtained gyro measurements may be multiplied by a sliding scale algorithm's output (e.g., a linear or nonlinear equation), reaching full gain when platform angular velocities require full feedforward compensation. The feedforward module's output is then added to the feedback module's output, directly affecting the mirror actuator's drive signal. This can improve tracking performance by up to 10 dB or more when compensating for platform rotational motion, as measured by RMS tracking error around the optical boresight.

Figure 7:
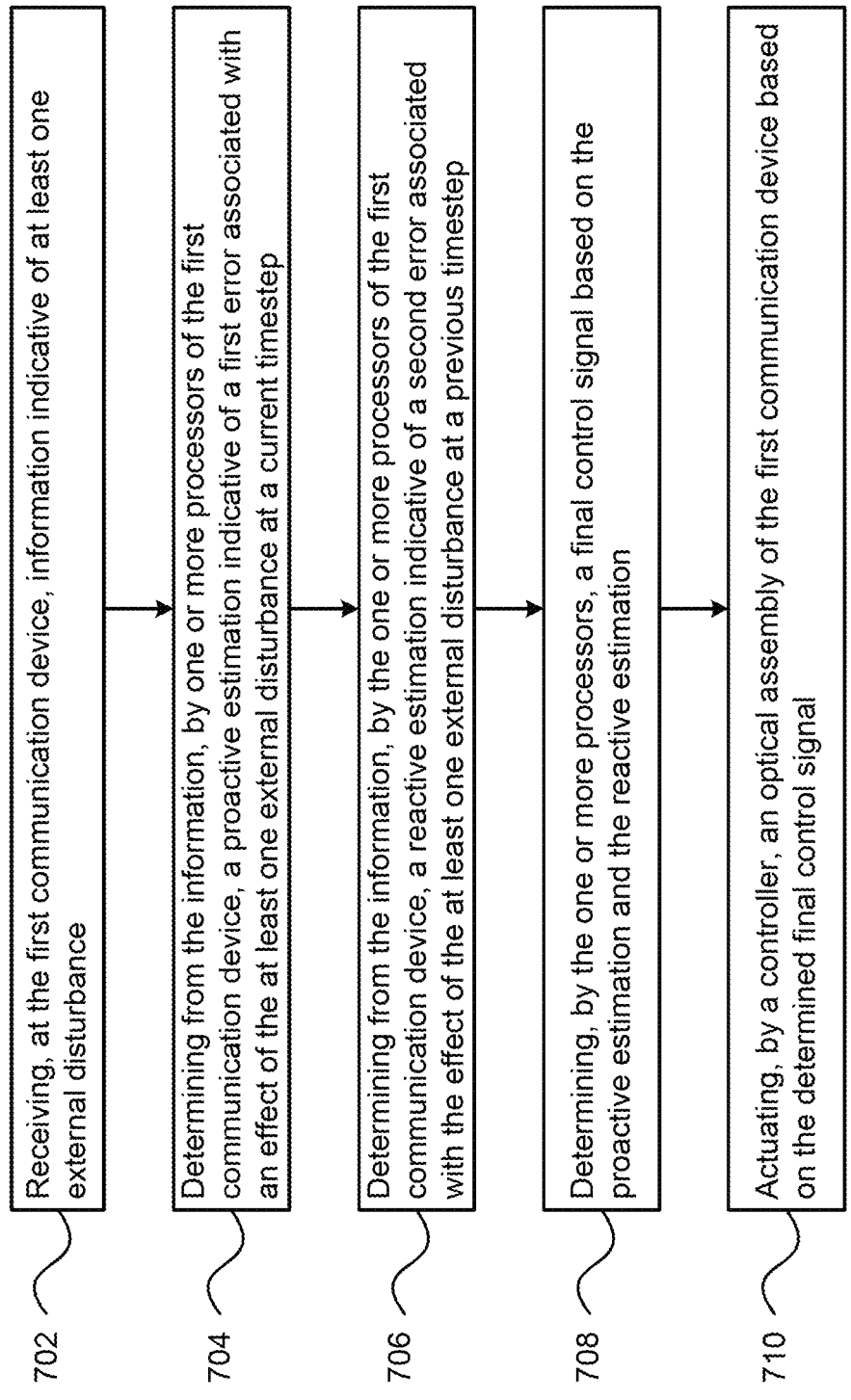
FIG. 7 illustrates an example method in accordance with aspects of the disclosure.

FIG. 7 illustrates an example method 700 for adjusting an optical link alignment of a first communication device with a remote communication device. As shown in block 702, the method includes receiving, at the first communication device, information indicative of at least one external disturbance. At block 704, the method includes determining from the information, by one or more processors of the first communication device, a proactive estimation indicative of a first error associated with an effect of the at least one external disturbance at a current timestep. At block 706 the method includes determining from the information, by the one or more processors of the first communication device, a reactive estimation indicative of a second error associated with the effect of the at least one external disturbance at a previous timestep. At block 708 the method includes determining, by the one or more processors, a final control signal based on the proactive estimation and the reactive estimation. And at block 710, the method includes actuating, by a controller, an optical assembly of the first communication device based on the determined final control signal.

The features and methodology described herein may provide an optical communication system the ability to maintain a communication link with less power output than a typical system and improved tracking capability that leads to higher communications performance, such as a lower bit error rate, higher signal to noise ratio, etc. The system is capable of yielding an increase in availability, for example, availabilities ranging from 20-100% as opposed to 0% or near 0% without applying the features and methodology described herein. The system allows for more precise beam targeting without the use of high-powered beacon transmissions to track a remote terminal. Tracking without the use of beacon transmissions improves link throughput, increases the link's tracking stability, and allows for operation over a broader range of link distances while using less power. The features described herein also allows for use of a narrower beam width as smaller scale adjustments are possible, in addition to fewer and or smaller components in the communication system, making the system more compact and efficient.

From the foregoing and with reference to the various figure drawings, those skilled in the art will appreciate that certain modifications can also be made to the present disclosure without departing from the scope of the same. While several implementations of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular implementations.

The invention claimed is:

1. A method for adjusting an optical link alignment of a first communication device with a remote communication device, the method comprising:
   receiving, at the first communication device, information indicative of at least one external disturbance;
   determining from the information, by one or more processors of the first communication device, a proactive estimation indicative of a first error associated with an effect of the at least one external disturbance at a current timestep, wherein determining the proactive estimation includes mapping the information from the current timestep to a first output by a feedforward gain scheduling approach;
   determining from the information, by the one or more processors of the first communication device, a reactive estimation indicative of a second error associated with the effect of the at least one external disturbance at a previous timestep;
   determining, by the one or more processors, a final control signal based on the proactive estimation and the reactive estimation; and
   actuating, by a controller, an optical assembly of the first communication device based on the determined final control signal.

2. The method of claim 1, wherein the information indicative of the at least one external disturbance includes behavior information of the remote communication device from the previous timestep.

3. The method of claim 2, wherein the behavior information includes a set of factors associated with the remote communication device.

4. The method of claim 3, wherein the set of factors includes at least one of a setpoint of the remote communication device, a pose of the remote communication device, an angular velocity of the remote communication device, acceleration of the remote communication device, or a target location of the remote communication device.

5. The method of claim 2, wherein the behavior information is based on information pertaining to the at least one external disturbance at the previous timestep received from either one or more sensors of the remote communication device or one or more sensors of the first communication device.

6. The method of claim 1, wherein:
   determining the proactive estimation includes determining the first error; and
   determining the reactive estimation includes determining the second error.

7. The method of claim 6, wherein the final control signal is determined by summing the first error and the second error.

8. The method of claim 2, wherein:
   determining the reactive estimation includes mapping the behavior information from the previous timestep to a second output by a feedback gain scheduling approach;
   the first output is the proactive estimation; and
   the second output is the reactive estimation.

9. The method of claim 8, wherein the feedforward gain scheduling approach is defined by:

$$u\_FF(t)=G\_FF(m),$$

where u_FF(t) is the first output, t is time, G_FF is a feedforward function, and m is the information from the current timestep.

10. The method of claim 8, wherein the feedback gain scheduling approach is defined by:

$$u\_FB(t)=G\_FB(m),$$

where u_FB(t) is the second output, t is time, G_FB is a feedback function, and m is the behavior information from the previous timestep.

11. The method of claim 1, further comprising:
repeating the steps of receiving the information, determining the proactive estimation, determining the reactive estimation, and determining the final control signal in a plurality of forward timesteps.

12. The method of claim 11, further comprising:
repeating the steps of receiving the information, determining the reactive estimation, and determining the final control signal in a plurality of forward timesteps;
wherein the proactive estimation is not determined in at least one forward timestep, and the final control signal in the at least one forward timestep is only based on the reactive estimation.

13. The method of claim 11, further comprising:
repeating the steps of receiving the information, determining the proactive estimation, and determining the final control signal in a plurality of forward timesteps;
wherein the reactive estimation is not determined in at least one forward timestep, and wherein the final control signal in the at least one forward timestep is only based on the proactive estimation.

14. The method of claim 1, wherein actuating, by the controller, the optical assembly of the first communication device based on the determined final control signal includes adjusting a target location or a setpoint location.

15. The method of claim 1, further comprising instructing the remote communication device to adjust a target location or a setpoint location based on the determined final control signal.

16. A communication device, comprising:
a transmitter configured to transmit an outbound optical signal to a remote communication device;
a receiver configured to receive an inbound optical signal from the remote communication device;
one or more processors configured to:
determine a proactive estimation indicative of a first error associated with an effect of at least one external disturbance at a current timestep by mapping information from the current timestep to a first output by a feedforward gain scheduling approach,
determine a reactive estimation indicative of a second error associated with the effect of the at least one external disturbance at a previous timestep, and
determine a final control signal based on the proactive estimation and the reactive estimation; and
a steering mechanism configured to adjust, when instructed by the one or more processors, the communication device based on the final control signal.

17. The communication device of claim 16, wherein the proactive estimation and the reactive estimation are determined based on information indicative of the at least one external disturbance, the information indicative of the least one external disturbance including behavior information of the remote communication device from the previous timestep.

18. The communication device of claim 17, wherein the one or more processors are further configured to:
map the behavior information from the previous timestep to a second output by a feedback gain scheduling approach;
wherein the first output is the proactive estimation and the second output is the reactive estimation.

19. The communication device of claim 18, wherein the feedforward gain scheduling approach is defined by:

$$u\_FF(t)=G\_FF(m),$$

where u_FF(t) is the first output, t is time, G_FF is a feedforward function, and m is the information from the current timestep.

20. The communication device of claim 18, wherein the feedback gain scheduling approach is defined by:

$$u\_FB(t)=G\_FB(m),$$

where u_FB(t) is the second output, t is time, G_FB is a feedback function, and m is the behavior information from the previous timestep.

21. The communication device of claim 16, wherein the communication device is stationary.

22. The communication device of claim 16, wherein the communication device is mobile.

* * * * *